(12) United States Patent
Braun et al.

(10) Patent No.: US 7,788,078 B1
(45) Date of Patent: Aug. 31, 2010

(54) PROCESSOR/MEMORY CO-EXPLORATION AT MULTIPLE ABSTRACTION LEVELS

(75) Inventors: Gunnar Braun, Aachen (DE); Olaf Zorres, Aachen (DE); Achim Nohl, Aachen (DE); Andreas Hoffmann, Herzogenrath (DE)

(73) Assignee: Synopsys, Inc., Mountain View, CA (US)

( * ) Notice: Subject to any disclaimer, the term of this patent is extended or adjusted under 35 U.S.C. 154(b) by 1462 days.

(21) Appl. No.: 11/069,496

(22) Filed: Feb. 28, 2005

Related U.S. Application Data

(60) Provisional application No. 60/548,711, filed on Feb. 27, 2004.

(51) Int. Cl.
G06F 17/50 (2006.01)
G01R 31/28 (2006.01)
(52) U.S. Cl. .................. 703/14; 703/2; 716/4; 716/5; 711/100
(58) Field of Classification Search .................. 703/2, 703/13, 14; 716/4, 5; 711/100
See application file for complete search history.

(56) References Cited

U.S. PATENT DOCUMENTS

| | | | |
|---|---|---|---|
| 6,698,002 B2 * | 2/2004 | Chang et al. | 716/4 |
| 2003/0033588 A1 * | 2/2003 | Alexander | 717/107 |
| 2003/0046671 A1 * | 3/2003 | Bowen | 717/141 |
| 2003/0191797 A1 * | 10/2003 | Gurevich et al. | 709/200 |
| 2005/0049843 A1 * | 3/2005 | Hewitt et al. | 703/14 |
| 2007/0277130 A1 * | 11/2007 | Lavelle | 716/4 |

* cited by examiner

Primary Examiner—Thai Phan

(57) ABSTRACT

Processor/memory co-exploration at multiple abstraction levels. An architecture description language (ADL) description of a processor/memory system is accessed. The ADL description models on one of a plurality of abstraction levels. The abstraction levels may include a functional (or bit-accurate) level and a cycle-accurate level. Further, a communication protocol for the processor/memory system is accessed. The communication protocol is formed from primitives, wherein a memory interface formed from the primitives is useable in simulation at the abstraction levels. A processor/memory simulation model is automatically generated from the description and description of the communication protocol. The processor/memory simulation model comprises a processor/memory interface comprising the primitives and based on the communication protocol. The memory interface allows simulation of the processor/memory on the appropriate abstraction level for the simulation. For example, the processor/memory interface may be a functional interface or a cycle-accurate interface.

16 Claims, 8 Drawing Sheets

PROCESSOR/MEMORY CO-EXPLORATION AT MULTIPLE ABSTRACTION LEVELS

RELATED APPLICATION

This Application claims priority to U.S. Provisional Application entitled, "Processor/Memory Co-Exploration on Multiple Abstraction Levels," Application No. 60/548,711, filed on Feb. 27, 2004, to Braun et al., which application is hereby incorporated by reference.

FIELD OF THE INVENTION

Embodiments of the present invention relate to the field of software tools for system level design. Specifically, embodiments of the present invention relate to a generic memory simulation model with interfaces that are usable for processor/memory co-exploration on multiple abstraction levels.

BACKGROUND ART

Recently, the evolution of embedded systems has shown a strong trend towards application-specific, single-chip solutions. As a result, application-specific instruction set processors (ASIP) are replacing off-the-shelf processors in such systems-on-chip (SoC). Along with the processor cores, heterogeneous memory architectures play an important role as part of the system. As such architectures are highly optimized for a particular application domain, processor core and memory subsystem design should not be apart, but should merge into an efficient design process.

One of the key factors for a successful design of application-specific instruction set processors (ASIP) is an efficient architecture exploration phase. The objective of the architecture exploration is to reduce the huge design space in order to find the best-suited architecture for a given application under a number of constraints, such as performance, power consumption, chip size, and flexibility. Although there are a number of analytical approaches, large parts of the design space exploration still have to be carried out by simulating alternative architecture implementations. It becomes obvious that the design methodology and simulation performance have a significant impact on the efficiency of the exploration process, hence, on the quality of the architecture implementation and the design time.

The EXPRESSION language is one of few architecture description languages that allow for processor/memory co-exploration. Besides the ability to model the processor core on a micro-architecture level, the memory subsystem can be described by choosing from predefined memory models for DRAM, SRAM, caches, etc., and describing the interconnectivity as a netlist. However, the EXPRESSION language only supports cycle-accurate memory modeling.

Poseidon Technologies offers a memory architecture exploration tool, MemBrain, which is based on an extensible architecture description language XADL. However, similar to EXPRESSION, only cycle-accurate modeling is supported.

Dinero-IV is a memory simulator written in the C programming language, which is capable of modeling arbitrary deep cache hierarchies. The simulator takes a memory trace as input and generates memory profiling data. Similar approaches are Active-Memory (see e.g., A. R. Lebeck and D. A. Wood, "Active Memory: A New Abstraction for Memory-System Simulation"); MemSpy (see e.g., M. Martonosi, A. Gupta, and T. E. Anderson, "Memspy: Analyzing Memory System Bottlenecks in Programs"), and Tycho (see e.g., M. D. Hill, "Aspects of Cache Memory and Instruction Buffer Performance"). However, all these simulators are decoupled from the processor design process, and do not allow the modeling of very heterogeneous memory architectures.

SUMMARY OF THE INVENTION

Therefore, it would be advantageous to provide a method and system for processor/memory co-exploration at multiple abstraction levels. It would be advantageous to provide an efficient way of considering instruction set and memory architecture during the entire exploration process.

Embodiments of the present invention provide a unified approach for processor/memory co-exploration using an architecture description language. Embodiments of the present invention provide an efficient way of considering instruction set and memory architecture during the entire exploration process. Embodiments of the present invention allow modeling a processor/memory system at multiple abstraction levels. The abstraction levels may include a functional (or bit-accurate) level and a cycle-accurate level. Embodiments of the present invention provide these advantages and others as described in the following.

Accordingly, embodiments of the present invention provide methods and systems for processor/memory co-exploration at multiple abstraction levels. One embodiment is a computer-implemented method of facilitating processor/memory co-exploration on multiple abstraction levels. The method comprises accessing a processor/memory system description written in an architecture description language (ADL). The processor/memory description models on one of a plurality of abstraction levels. The abstraction levels may include a functional (or bit-accurate) level and a cycle-accurate level. Further, a communication protocol for the processor/memory system is accessed. The communication protocol is formed from primitives, wherein memory interfaces formed from the primitives are usable in simulations at the abstraction levels of the processor/memory description.

A processor/memory simulation model is automatically generated from the description and the communication protocol. The processor/memory simulation model comprises a processor/memory interface comprising the primitives and based on the communication protocol. Furthermore, the processor/memory interface is used in simulation of the processor/memory on the appropriate abstraction level for the simulation. For example, the processor/memory interface may be a functional or a cycle-accurate interface.

Another embodiment of the present invention is a set of application program interfaces (APIs) for use in processor/memory co-simulations on multiple abstraction levels. The APIs include a first and a second set of primitives. The first set of primitives is able to form a communication protocol used with a functional level processor/memory description in an architecture description language (ADL). The second set of primitives is able to form a communication protocol used with a cycle-accurate processor/memory description in the architecture description language (ADL). The functional level and the cycle-accurate level processor/memory descriptions are suitable for input to an automatic simulation generation tool. Thus, an automatically generated functional processor/memory simulation model comprises a functional memory interface comprising the first set of primitives, and an automatically generated cycle-accurate level memory/memory simulation model comprises a cycle-accurate interface comprising the second set of primitives.

Yet another embodiment is a system for processor/memory co-exploration at multiple abstraction levels. The system comprises memory interface primitives operable to form processor/memory simulation communication protocols on multiple abstraction levels. The system further includes a simulation generator for automatically generating a processor/memory simulation from an ADL description of a processor/memory system comprising a communication protocol formed from the primitives. The automatically generated processor/memory simulation is at one of the multiple abstraction levels and comprises an interface at the one abstraction level. For example, the processor/memory simulation may be suitable for functional simulation with the interface being a function interface. Alternatively, the processor/memory simulation may be suitable for cycle-accurate simulation with the interface being a cycle-accurate interface.

DETAILED DESCRIPTION OF THE INVENTION

In the following detailed description of embodiments of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "generating" or "processing" or "computing" or "determining" or "importing" or "storing" or "constructing" or "accessing" or "selecting" or "forming" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
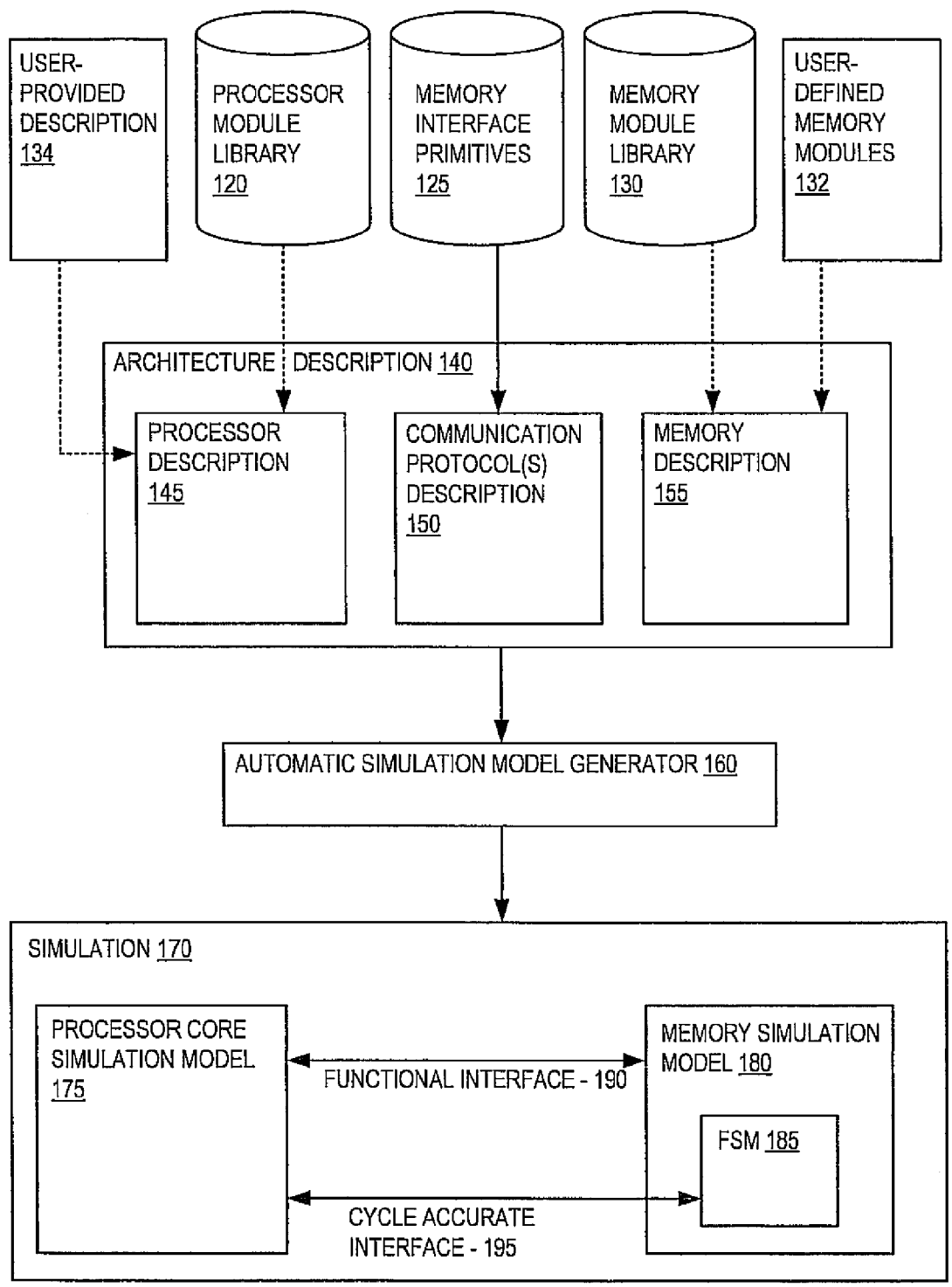
FIG. 1 is a diagram illustrating a system for processor/memory co-exploration on multiple abstraction levels, in accordance with an embodiment of the present invention.

FIG. 1 is a diagram illustrating a system for processor/memory co-exploration on multiple abstraction levels, in accordance with an embodiment of the present invention. The architecture description 140 contains an ADL description of a processor 145 and a memory 155, as well as at least one communication protocol 150. The architecture description 140 may be at a functional abstraction level or a cycle-accurate abstraction level.

The communication protocol 150 may be formed from memory interface primitives 125. An exemplary set of memory interface primitives is described herein. The primitives may be used to form either a functional (e.g., bit accurate) interface 190 or a cycle-accurate interface 195 in the simulation. The processor module library 120 and a memory module library 130 are available for pre-defined modules for use in the ADL description 140. The use of pre-defined modules (both processor and memory) may save the designer substantial time by allowing the re-use of "IP" (Intellectual Property). However, a user may write custom modules 132 (e.g., custom memory modules) or otherwise provide a custom description 134. The user-provided description may be used to describe an application-specific instruction set processors (ASIP) or the like. Exemplary memory modules that may be included in the memory module library 130 are described herein.

The ADL description 140 is input into an automatic simulation generator 160, which automatically generates a processor/memory simulation 170 from the ADL description 140. Tools for automatically generating a simulation model from an ADL description are known. For example, LisaTek™ processor designer, which is commercially available from CoWare™ of San Jose, Calif., is capable of automatically generating a simulation model from an ADL description. The processor/memory simulation 170 comprises a processor core simulation model 175, a memory simulation model 180, functional interface 190, and cycle-accurate interface 195. The functional interface 190 is typically used for a functional or bit-accurate simulation. The cycle-accurate interface 195 is typically used for a cycle accurate simulation.

The memory simulation model 180 does not require a clock or finite state machine when performing a functional simulation. Hence, the functional simulation is very efficient, allowing for rapid exploration of design alternatives. The memory simulation model 180 uses a finite state machine (FSM) 185 for cycle-accurate simulation.

An embodiment in accordance with the present invention provides an extension to the language for instruction set architectures (LISA). LISA is an ADL (Architecture Description Language) that is suitable for the description of instruction set processor architectures. LISA belongs to the class of ADLs referred to as "mixed structural/behavioral" ADLs. For example, the model description comprises a structural part describing processor resources such as registers, some memories, pipelines, and a behavioral part reflecting the processor's instruction set including instruction encodings, assembly syntax, functional behavior, and timing.

LISA is capable of modeling the processor architecture on different abstraction levels regarding the hardware structure as well as time. That means, a purely functional model of the instruction set can be refined in structure by e.g., adding a pipeline or I/O interfaces, and by increasing temporal accuracy, e.g., by changing the granularity from instructions to clock cycles. An embodiment of the present invention extends LISA such that it is capable of modeling non-ideal memories. For example, embodiments of the present invention add notions of latencies, caches, and memory interconnects by adding language support for a flexible and intuitive description of arbitrary memory architectures. It will be understood that the principles of the present invention are applicable to other than the LISA language.

Memory Modules

An embodiment of the present invention provides for a number of pre-defined memory modules that are defined in the model description by providing memory type, data type, size, and a number of (partly) optional parameters depending on the memory type. In one embodiment, the memory module library 130 in FIG. 1, comprises the following pre-defined memory types. However, the present invention is suited to other pre-defined memory modules. Pre-defined memory types include, but are not limited to, "bus," "cache," "RAM," and "write buffer." The parameters available for configuration of exemplary predefined modules are shown in Table I.

TABLE I

| Memory Type | Parameters |
| --- | --- |
| CACHE | line size, number of lines, associativity, write allocation policy, write back policy, replacement policy, read/write latency, block size, subblock size, endianess |
| RAM | size, page size, read/write latency for normal, burst, and page mode access, endianess, block size, subblock size, number of banks |
| BUS | transfer block/subblock size, address type, latencies |
| WRITEBUFFER | line size, block size, subblock size, flush policy, write latency, endianess |

Additionally, memories can be configured for read-only or read-write access, in one embodiment. An advantage of this is the free choice of the desired data type of the memory blocks. For example, the memory model is not limited to byte- or word-wise organized memories. Although less frequently appearing in practice, some very application-specific architectures with extremely tight constraints on code size employ program memories with bit-widths that are not a multiple of eight. In these cases, it is possible to use a bit data type provided by LISA language in order to define e.g., 21-bit instruction memories. This allows the definition of a very compact instruction set without wasting memory for each stored instruction. In order to ease the exploration process, parameters shown in Table I can be changed during simulator run-time.

In addition to pre-defined memory modules, a user may define his own custom modules, which may be integrated into the architecture model. A user defined memory module should be written to comply with the functional and cycle-accurate interfaces being used.

Interconnectivity of Memory Modules and Processor Core

The interconnectivity of instantiated memories and the processor core may be established by specifying the "next level module(s)" for each memory component. Each cache, bus, or buffer may "see" only the next level memory it can access, in one embodiment. Buses play a particular role, since they can connect to more that one memory, hence, each attached memory may be identified by an address space unique for that particular bus.

The connection between processor and memories may be established by assigning separate address ranges from the processor's address space to the defined memories components. In one embodiment, a "memory map" that complies with the LISA model describes how memory addresses are mapped onto the physical addresses of the respective memories. However, the following example is exemplary; therefore, the present invention is not limited to the LISA language. A sample address mapping scheme is shown in Table II.

TABLE II

```
MEMORY_MAP
{
    BUS(pbus), RANGE(0x0800000,0x087ffff) ->
    icache[(31 ... 2)];
    BUS(dbus), RANGE(0x0200000,0x020ffff) \ ->
    banked1[(1 ... 0)][(31 ... 2)];
    BUS(dbus), RANGE(0x0300000,0x030ffff) \ ->
    banked2[(19 ... 18)][(17 ... 0)];
}
```

The exemplary LISA code excerpt in Table II shows mappings for three different address ranges. The first line defines a mapping of the address range specified by the RANGE keyword onto a memory "icache." The parameter in square brackets following the memory name describes the actual address translation through a bit mask. The range (31 ... 2) indicates that the last two bits of the address are ignored for addressing "icache," or, each four consecutive addresses refer to the same memory block. This is a common setup for byte-wise addressable memories with a block size of 32 bits. Furthermore, the memory is attached to a bus "pbus."

The second and third line of the example in Table II show two common address mapping schemes for banked memories, "block addressing" and "interleaved addressing". In the second mapping, the two least significant bits of an address are used to address the first dimension of the two-dimensional memory "banked1." As the first dimension selects the memory bank, this is an interleaved address mapping where consecutive addresses refer to different banks. In the block addressing scheme in the third line, bits 18 and 19 are used to select the bank, e.g., coherent blocks of addresses are mapped onto the same memory banks.

The exemplary description contained in the memory map allows the modeling of most address mappings commonly in found in embedded processors. However, the present invention is not limited to the exemplary memory map. Furthermore, embodiments of the present invention accept user defined memory mappings. For example, a user may describe a complex virtual address translation as performed in processors with a memory management unit (MMU) (e.g. MIPS and some ARM implementations). A user-provided custom C(++) function may be used to provide the mapping. The custom C(++) function may be included in the ADL of the processor/memory system.

Memory Interface

While the description of memories and their interconnects determines the structural abstraction level, the temporal accuracy may be defined by how the memory is accessed from the model of the processor core. Embodiments of the present invention provide two memory interfaces to access data from the defined memories, a "functional" and a "cycle-accurate" interface.

Functional Interface

The functional memory interface allows basic access to the memory subsystem. The functional interface may be bit-accurate, as opposed to cycle-accurate. It is made up of two methods, a "read" and a "write" function, in one embodiment. Both methods accept a number of parameters for specifying access mode (e.g., burst) and requested block or subblock. The requested memory access is performed immediately, and the accumulated latency may be returned (in case of success).

The use of the functional interface has a number of advantages compared to the cycle-accurate interface. For example, it is very simple to use within a functional, instruction-based model description, because the designer can assume that data is available when requested. Although, the functional interface limits the ability to model complex memory controllers, it allows a working model of the architecture to be rapidly established. While the functional interface is not cycle accurate, thus implying a certain temporal inaccuracy, operation timing is generally not of concern this early in the design phase.

A second advantage of the functional interface over a cycle-accurate interface is that very high simulation speed can be achieved. This is because memory simulation only takes place when an access is performed. That means, the memory simulator does not have to store a state of progress or to perform a request queue management because each memory access is self-contained. As a consequence, this obsoletes the need for synchronous memory simulation (as typically used for cycle-accurate memory simulation).

Further, the simplicity of the functional interface is extremely valuable for the integration of proprietary memory components. An embodiment of the present invention allows custom modules that comply with the functional interface to be integrated into the design. For instance, a C(++)-based bus module with a customized protocol may be included by embedding the bus model into an interface wrapper. Once the module obeys the functional interface, it can be employed as any of the pre-defined modules, e.g., instantiated, wired, and accessed.

In summary, the use of the functional memory interface allows a quick iteration cycle, since changes are carried out within minutes, and, due to the high simulation performance, profiling results showing latency cycles, cache hit/miss rates, and bottlenecks in the memory architecture are quickly obtained.

However, functional memory simulation may not be appropriate to exploit parallelism, for example, parallel or pipelined memory architectures. Therefore, once a processor/memory architecture is found that roughly meets the initial design criteria, the model can be refined to a cycle-accurate model, which may be used to collect the desired profiling data of the micro-architecture.

Cycle-Accurate Interface

The cycle-accurate memory access may use a "request-based" interface in which each access should be "requested" first before the actual transaction can take place. Therefore, the cycle-accurate interface provides separate methods for sending access requests to memory and eventually receiving data (in case of a read operation).

As data might not be available until several clock cycles have passed after the request, the memory possibly adopts many internal states of progress while processing the request(s). Therefore, a synchronous simulation of the memory architecture is used. In one embodiment, a state transition function as part of the memory interface, which is called for each simulated clock cycle, serves this purpose.

The application of the cycle-accurate memory interface has a number of consequences for the processor model. In contrast to functional memory simulation, the processor model accounts for unavailability of memory resources, for instance, by stalling program execution until data becomes available. On the other hand, cycle-accurate modeling allows different pipeline stages to be used for initiation and completion of a data transfer. This stresses the importance of processor/memory co-exploration, since the choice of the memory affects the design of the pipeline, and vice versa.

In summary, the migration from functional to cycle-accurate memory access results in a model much closer to the hardware, and thus allows a further, deeper exploration of the architecture. On a cycle-accurate abstraction level, pipelines or buffers might be introduced, or separate buses might be chosen for instruction and data memory. It may be very difficult to measure the effects of these modifications on functional level.

Figure 4:
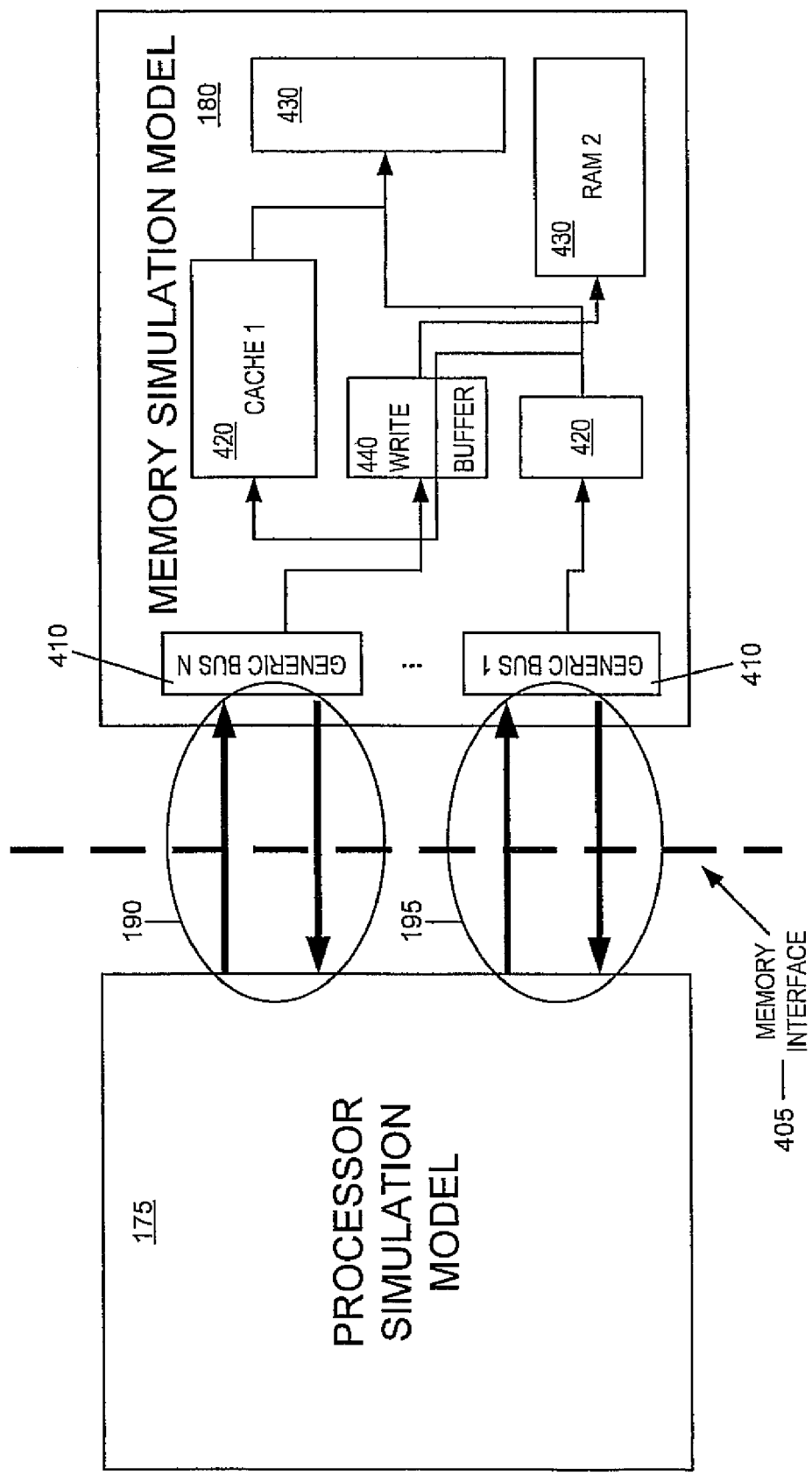
FIG. 4 is a block diagram of a memory interface for a processor model to communicate with memory modules in a simulation model, in accordance with an embodiment of the present invention.

FIG. 4 depicts a memory interface for communicating with memory modules in accordance with embodiments of the present invention. The memory simulation model 180 includes generic bus models 410[1]-410[n] and may include models for caches 420, RAMs 430, write buffers 440, etc. The memory simulation model 180 is not limited to these models. The bus models 410 are included as part of the memory model 180 because they establish the interconnections between various memories and the processor model 175, although a bus is typically not considered as a memory unit. The memory interface 405 (e.g., API) may include various primitives, examples of which are described herein. For example, primitives may include read data, write data, request a future read, request a future write, check if data has been read, check if data has been written. This list is not exhaustive. The memory interface may include a functional interface 190 and a cycle-accurate interface 195.

Figure 5:
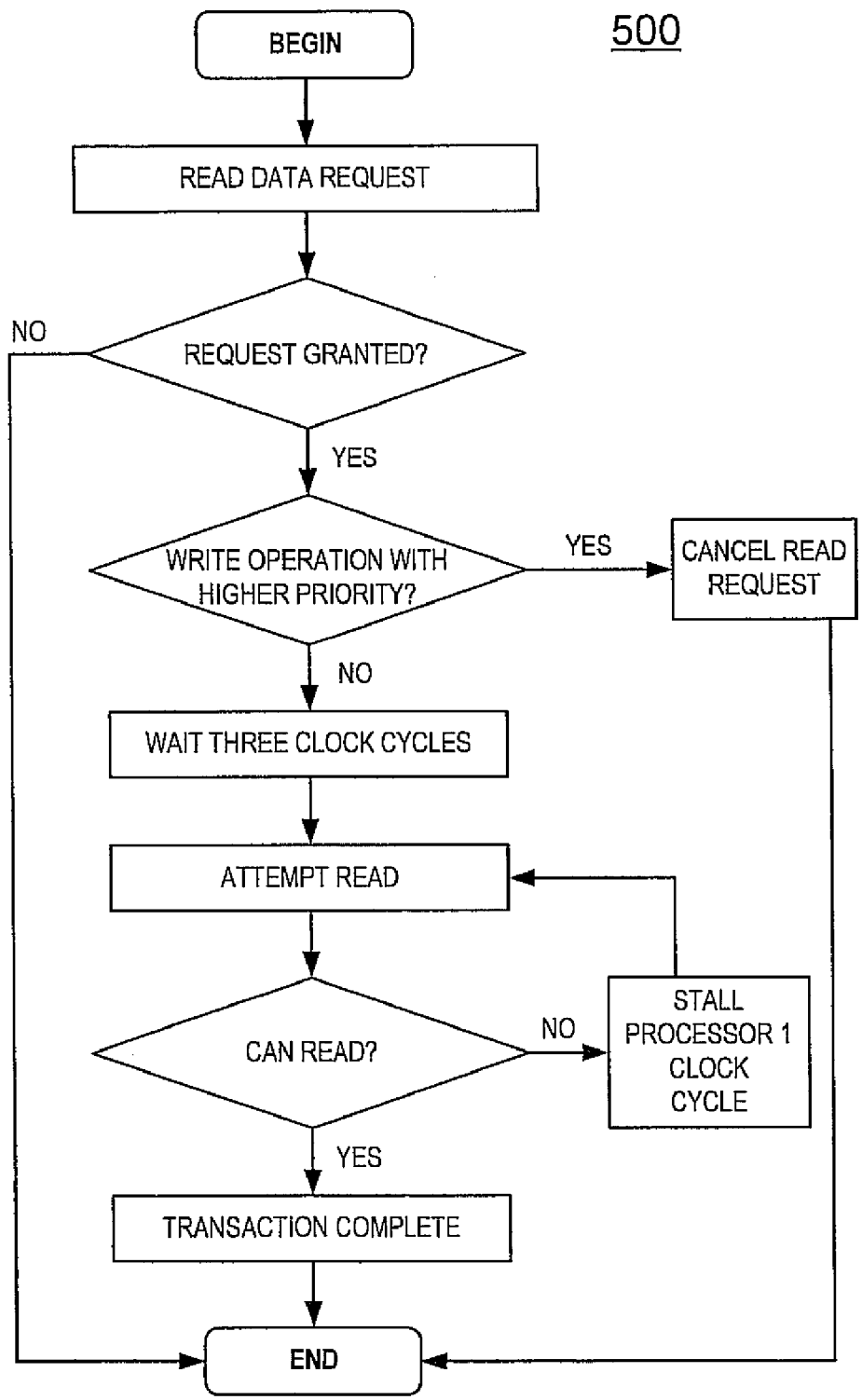
FIG. 5 is a flowchart illustrating an exemplary protocol that may be formed from primitives in accordance with an embodiment of the present invention.

A communication protocol may be formed by the composition and sequence of the primitives. A portion of an exemplary protocol is depicted in process 500 of FIG. 5. Depending on the memory and processor, there may be an arbitrary number of such protocols. In accordance with embodiments of the present invention, the primitives are designed in a generic manner to support a large number of protocols.

Exemplary primitive methods or functions are presented in Table III-XVI. The primitives may be used to form communication protocols, as described herein. The functional interface and the cycle accurate interface may include appropriate ones of the exemplary primitives. Table III depicts a templated base class for objects within the memory hierarchy. This is the abstract base class for all memory objects. Any memory module that is to be integrated into a processor model should obey the interface specified within this class. The API supports synchronous and asynchronous memory access. This class is templated by data type (DType) and address type (AType).

TABLE III template<class DType, class AType>
class CMemAccess< DType, AType >

TABLE IV

| template<class DType, class AType> virtual int CMemAccess< DType, AType >::read( | AType addr, DType * data, int n = 1, int sb = −1, int len = −1 ) |
|---|---|

Parameters:
addr     the memory address to read from
data     pointer to a buffer where the read data should be stored
n     the number of elements to read
sb     bitmask defining the bits to be read, or, if len is given, the offset of the bitmask
len     the length of the bitmask (use sb as bitmask offset)
Returns:     the number of latency cycles Table V depicts a description of a function that writes data to a memory object.

TABLE V

| Template<class DType, class AType> virtual int CMemAccess< DType, AType >::write | (AType addr, DType * data, int n = 1, int sb = −1, int len = −1 ) [pure virtual] |
|---|---|

Parameters:
addr     the memory address to write to
data     pointer to a buffer where the data to be stored is found
n     the number of elements to store
sb     bitmask defining the bits to be modified, or, if len is given, the offset of the bitmask
len     the length of the bitmask (use sb as bitmask offset)
Returns:     the number of latency cycles Unlike the functional interface, the cycle-accurate interface is a request based interface. Thus, the cycle-accurate interface may use two functions (or primitives) for a memory access. One function for requesting the memory access and a second function for completing the memory access. Table VI depicts an exemplary description of a function that sends a read request to a memory object.

TABLE VI

| template<class DType, class AType> virtual int CMemAccess< DType, AType >::request_read | ( AType addr, DType * data =0, int n = 1, int sb = −1, int len = −1 ) |
|---|---|

Parameters:
addr     the memory address to read from
data     pointer to a buffer where the read data should be stored TABLE VI-continued n     the number of elements to read
sb     bitmask defining the bits to be read, or, if len is given, the offset of the bitmask
len     the length of the bitmask (use sb as bitmask offset)
Returns:     the number of latency cycles (positive integer or 0) or an error (negative integer)

Table VII depicts an exemplary description of a function that sends a write request to a memory object.

TABLE VII

| template<class DType, class AType> virtual int CMemAccess< DType, AType >::request_write | ( AType addr, DType * data = 0, int n = 1, int sb = −1, int len = −1 ) |
|---|---|

Parameters:
addr     the memory address to write to
data     pointer to a buffer where the data to be stored is found
n     the number of elements to store
sb     bitmask defining the bits to be written, or, if len is given, the offset of the bitmask
len     the length of the bitmask (use sb as bitmask offset)
Returns:     0 on success (request was accepted), otherwise an error code (negative integer)

Table VIII is an exemplary description for a "try to read" function that tries a read operation based on a previous request.

TABLE VIII

| template<class DType, class AType> virtual int CMemAccess< DType, AType >::try_read | ( AType addr, DType * data =0, int n =1, int sb = −1, int len = −1 ) |
|---|---|

Parameters:
addr     the memory address to read from
data     pointer to a buffer where the read data should be stored
n     the number of elements to read
sb     bitmask defining the bits to be read, or, if len is given, the offset of the bitmask
len     the length of the bitmask (use sb as bitmask offset)
Returns:     0 on success (request was accepted), otherwise an error code (negative integer)

Table IX is an exemplary description for a function to check of a write has been accepted.

TABLE IX

| template<class DType, class AType> virtual int CMemAccess< DType, AType >::could_write | ( AType addr, DType * data =0, int n = 1, int sb = −1, int len = −1 ) |
|---|---|

Parameters:
addr     the memory address to write to
data     pointer to a buffer where the data to be stored is found
n     the number of elements to store
sb     bitmask defining the bits to be modified, or, if len is given, the offset of the bitmask
len     the length of the bitmask (use sb as bitmask offset)
Returns:     0 on success (request was accepted), otherwise an error code (negativeinteger)

Table X is an exemplary description for a function for a debug (direct) read of a memory object.

TABLE X

| template<class DType, class AType> virtual int CMemAccess<DType, AType >::dbg_read | ( AType addr, DType * data =0, int n = 1, int sb = −1, int len = −1 ) |
|---|---|

Parameters:
addr    the memory address to read from
data    pointer to a buffer where the read data should be stored
n    the number of elements to read
sb    bitmask defining the bits to be read, or, if len is given, the offset of the bitmask
len    the length of the bitmask (use sb as bitmask offset)
Returns:    0 on success (request was accepted), otherwise an error code (negative integer)

Table XI is an exemplary description for a function for a direct write to a memory object.

TABLE XI

| template<class DType, class AType> virtual int CMemAccess< DType, AType >::dgd_write | ( AType addr, DType * data =0, int n = 1, int sb = −1, int len = −1 ) |
|---|---|

Parameters:
addr    the memory address to write to
data    pointer to a buffer where the data to be stored is found
n    the number of elements to store
sb    bitmask defining the bits to be modified, or, if len is given, the offset of the bitmask
len    the length of the bitmask (use sb as bitmask offset)
Returns:    0 on success (request was accepted), otherwise an error code (negative integer)

Table XII is an exemplary description for a function for a read from a memory object (runtime detect if debug or blocking)

TABLE XII

| template<class DType, class AType> virtual int CMemAccess< DType, AType >::auto_read | ( AType addr, DType * data = 0, int n = 1, int sb = −1, int len = −1 ) |
|---|---|

Parameters:
addr    the memory address to read from
data    pointer to a buffer where the read data should be stored
n    the number of elements to read
sb    bitmask defining the bits to be read, or, if len is given, the offset of the bitmask
len    the length of the bitmask (use sb as bitmask offset)
Returns:    0 on success (request was accepted), otherwise an error code (negative integer)

Table XIII is an exemplary description for a function for a read from a memory object (runtime detect if debug or blocking)

TABLE XIII

| template<class DType, class AType> virtual int CMemAccess< DType, AType >::auto_write | ( AType addr, DType * data = 0, int n = 1, int sb = −1, int len = −1 ) |
|---|---|

Parameters:
addr    the memory address to write to
data    pointer to a buffer where the data to be stored is found
n    the number of elements to store
sb    bitmask defining the bits to be modified, or, if len is given, the offset of the bitmask
len    the length of the bitmask (use sb as bitmask offset)
Returns:    the number of latency cycles Table XIV is an exemplary description for a function that gets the contents at a memory module address.

TABLE XIV

| template<class DType, class AType> virtual bool CMemAccess< DType, AType >::get_access_value | ( uint32 addr, luint * value ) |
|---|---|

Parameters:
addr    memory address to be read
value    value to read
Returns:    bool value indicating this operation is successful or failed Table XV is an exemplary description for a function that sets the contents at a memory module address.

TABLE XV

| template<class DType, class AType> virtual bool CMemAccess< DType, AType >::set_access_value | ( uint32 addr, luint * value ) |
|---|---|

Parameters:
addr    memory address to be modified
value    value to write
Returns:    bool value indicating this operation is successful or failed Table XVI depicts a description of a function that dispatches a command to the memory/bus module. This method can be used to send generic or even bus-specific commands through the memory hierarchy. The implementation may differ among different modules, e.g., some modules only forward the command while others might take actions on this.

TABLE XVI

| virtual int CMemAccess< DType, AType >::command | ( MA_COMMAND opcode, uint p1 = 0, uint p2 = 0, uint p3 = 0, uint p4 = 0 ) |
|---|---|

Figure 6A:
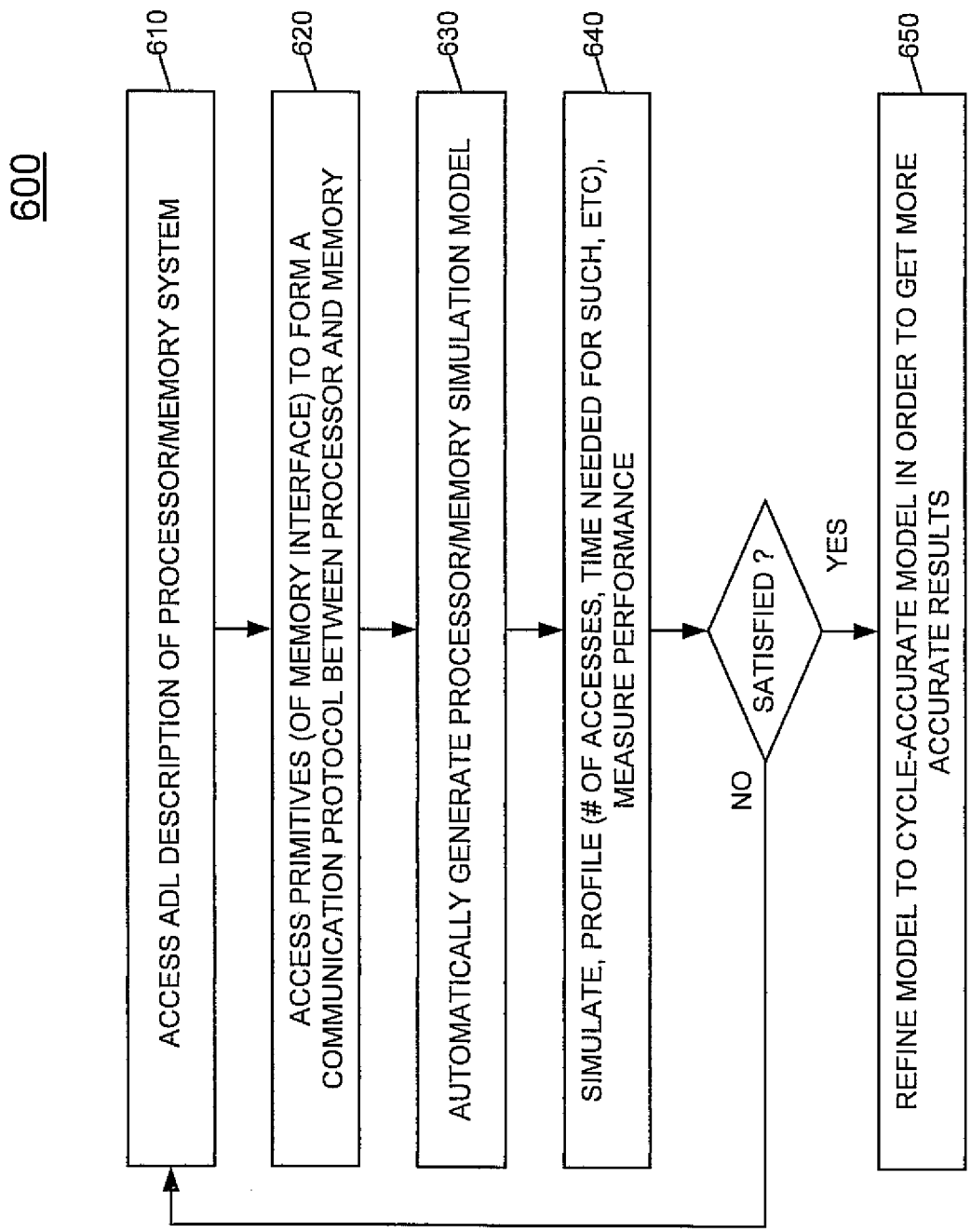
FIG. 6A illustrates an exemplary design flow on a functional abstraction level, in accordance with an embodiment of the present invention.
Figure 6B:
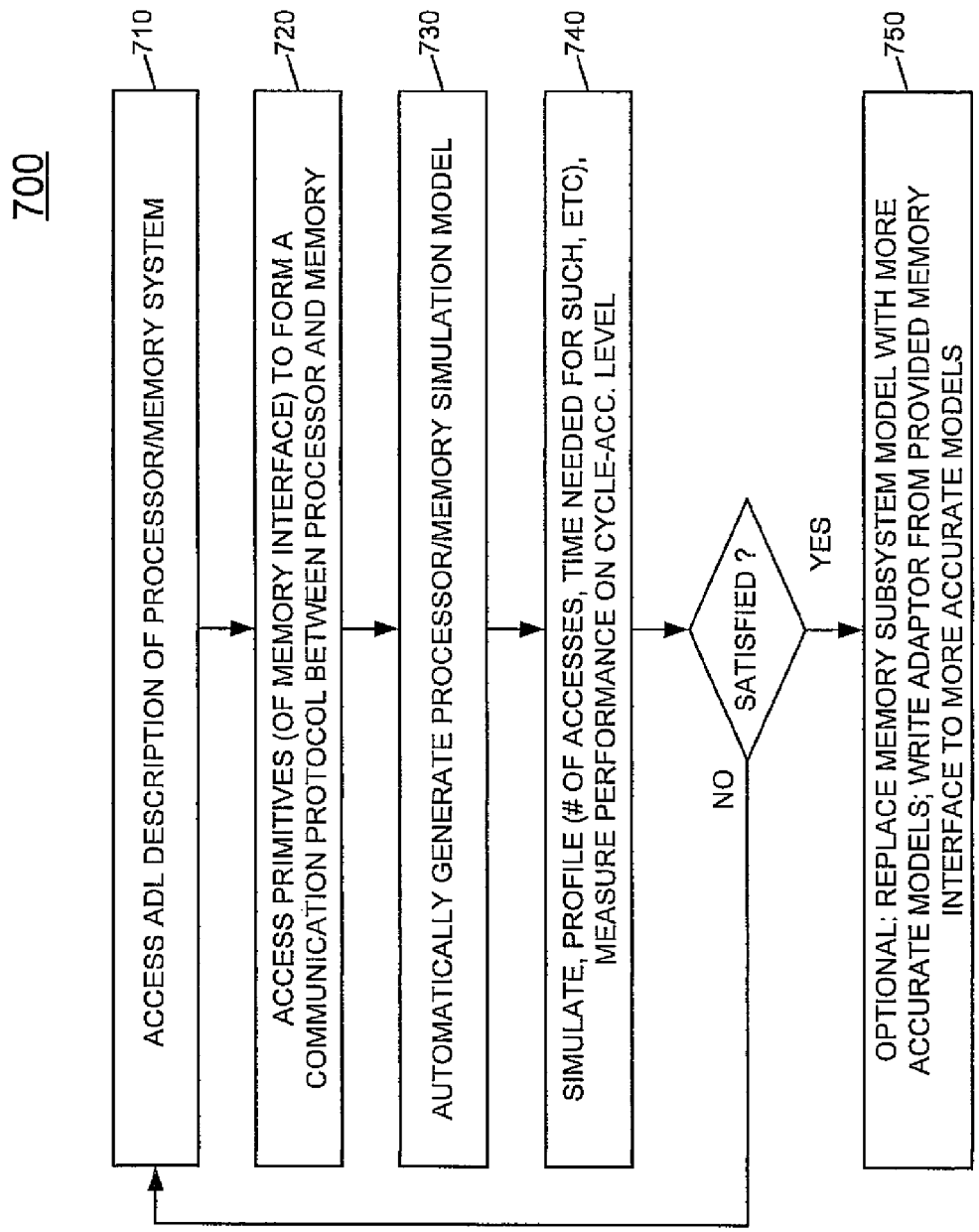
FIG. 6B illustrates an exemplary design flow on a cycle-accurate abstraction level, in accordance with an embodiment of the present invention.

FIG. 6A and FIG. 6B illustrate an exemplary design flow starting on a functional abstraction level (FIG. 6A) and proceeding to a cycle-accurate abstraction level (FIG. 6B), in accordance with an embodiment of the present invention. Referring now to FIG. 6A, step 610 is accessing a processor/memory description written in an ADL. The processor description may be instruction accurate, although not necessarily being cycle-accurate. Thus, it is suitable to model functional behavior of the instruction set. The processor description may be obtained from a library, such as processor module library of FIG. 1. The memory description may at a functional level of abstraction.

Step 620 is accessing primitives of a memory interface to form a communication protocol between the processor and the memory. For example, a user will use primitives to form at least one communication protocol.

Step 630 is automatically generating a processor/memory simulation model from the processor/memory description written in the ADL. The processor/memory, simulation model may include a functional memory interface including the primitives and based on the communication protocol.

Step 640 is running a processor/memory simulation in order to measure performance of the processor/memory system. For example, profiling results may reveal bottlenecks, time needed for access, etc.

If the user is not satisfied with the simulation results, the processor/memory system may be altered, wherein process 600 returns to step 610. For example, a cache or other memory type may be added or removed. Or one type of memory may be changed to another. For example, a DRAM may be replaced by a SRAM. Further, parameters associated with a memory may be altered. Table I provides some examples of alterable parameters. Changes to the memory model are very easy to make and do not require changes to the communication protocols.

When the user is satisfied with the simulation results, the processor/memory model is refined to a cycle accurate model to allow more accurate simulation. Thus, the processor description may be refined from an instruction accurate model to a cycle accurate, micro-architecture. For example, pipeline stages may be added. The memory description may be modified, as well. Process 600 then ends.

Referring now to process 700 of FIG. 6B, step 710 is accessing a processor/memory description written in an ADL. The processor description may be a cycle accurate, micro-architecture description.

Step 720 is accessing primitives of a memory interface to form a communication protocol between the processor and the memory. For example, a user will use primitives to form at least one communication protocol. To be cycle accurate, the communication protocol may comprise a request-based interface.

Step 730 is automatically generating a processor/memory simulation model from the ADL. The processor/memory simulation model may include a cycle accurate memory interface including the primitves and based on the communication protocol.

Step 740 is running a processor/memory simulation in order to measure performance of the processor/memory platform. For example, profiling results may reveal bottlenecks, time needed for memory access, etc.

If the user is not satisfied with the simulation results, the processor/memory system may be altered, wherein process 700 returns to step 710. As with the functional abstraction level, modification to the processor/memory model are very easy at the cycle accurate abstraction level. For example, a cache or other memory type may be added or removed. Or one type of memory may be changed to another. For example, a DRAM may be replaced by a SRAM. Further, parameters associated with a memory may be altered. Table I provides some examples of alterable parameters. Changes to the memory model are very easy to make and do not require changes to the communication protocols.

When the user is satisfied with the cycle accurate simulation results, process 700 may end. Optionally, the memory subsystem model may be replaced with another (e.g., more accurate) model in step 750. Step 750 may include writing an adaptor from the memory interface to the new (e.g.,) more accurate models.

Figure 7:
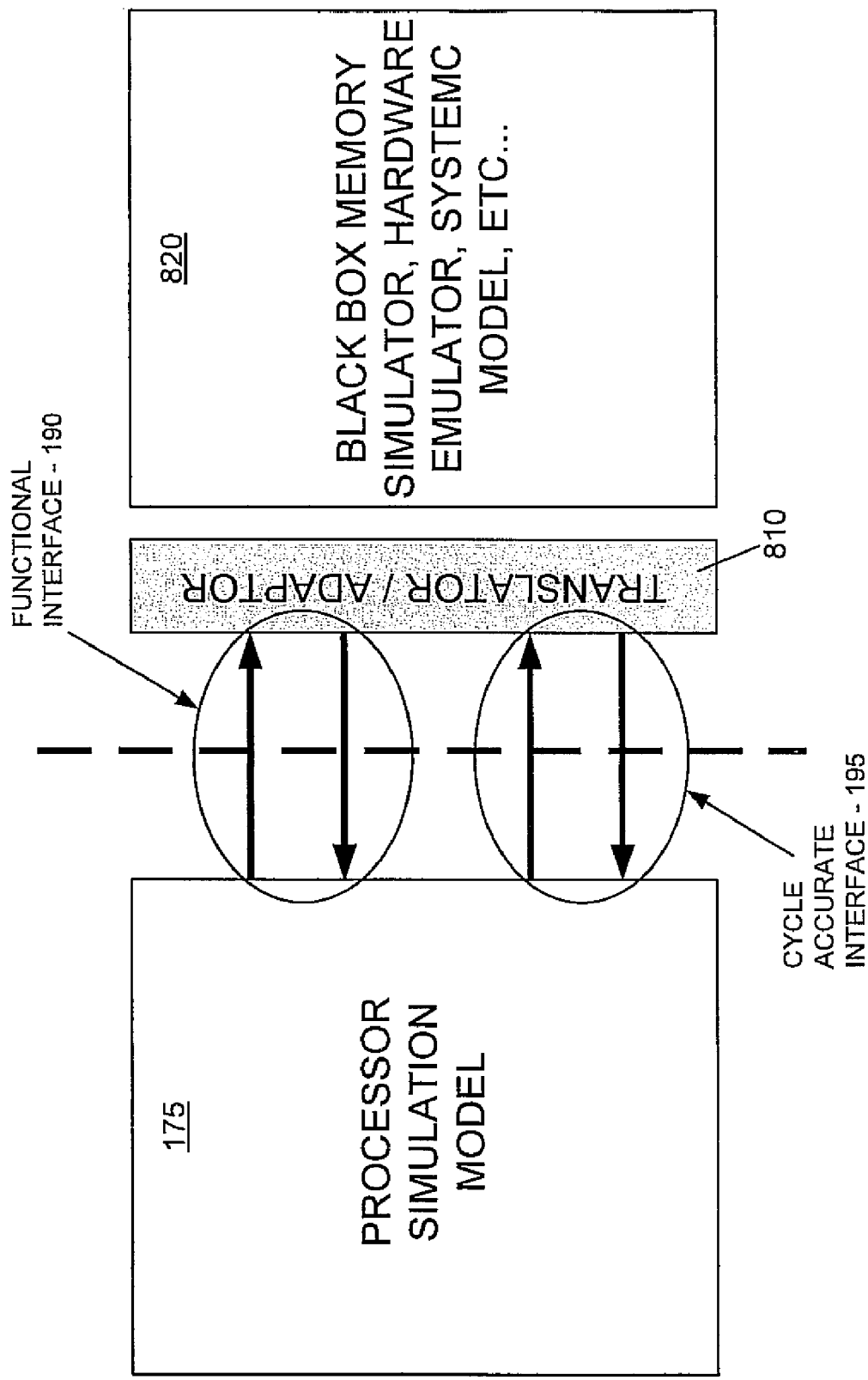
FIG. 7 illustrates a protocol translator/adaptor used to replace individual modules or an entire memory simulation model, in accordance with an embodiment of the present invention.

FIG. 7 illustrates how a translator/adaptor may be used to replace individual modules or even the entire memory simulation model, in accordance with an embodiment of the present invention. The translator/adaptor 810 allows the processor simulation model 175 to be attached to virtually any memory simulation environment, on any abstraction level. The translator/adaptor 810 may be a hand-written adaptor that translates the communication from processor to memory into the communication protocol of the new memory simulation environment. For example, the processor simulation model can use the existing functional interface 190 and cycle-accurate interface 195 with the translator/adaptor 810 providing the necessary protocol translation to interface with block 820. Block 820 may be, for example, a black box memory simulator, a hardware emulator, a SystemC model, etc. Thus, there is no need to change the ADL model, which reduces verification effort.

Figure 2:
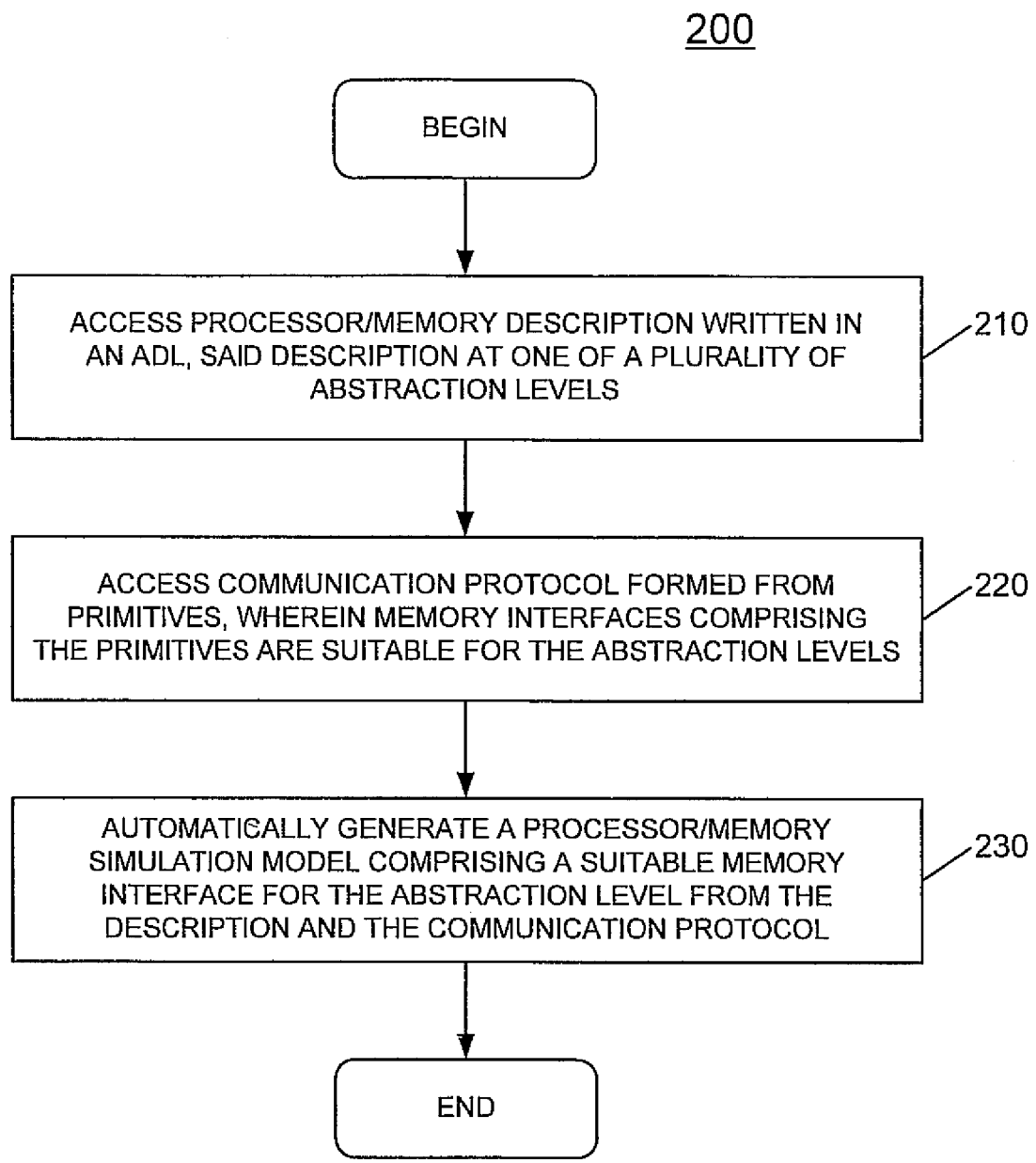
FIG. 2 is a flowchart illustrating a process of processor/memory co-exploration on multiple abstraction levels, in accordance with an embodiment of the present invention.

FIG. 2 depicts a computer-implemented process 200 of facilitating processor/memory co-exploration on multiple abstraction levels. Step 210 is accessing an ADL description of a processor/memory system. The ADL description models on one of a number of abstraction levels. The abstraction levels may include a functional (or bit-accurate) level and a cycle-accurate level.

Step 220 is accessing a communication protocol for the processor/memory system. The communication protocol is formed from primitives, wherein memory interfaces formed from the primitives are suitable for use in simulations on abstraction levels suitable for the processor/memory ADL description. Exemplary primitives are described herein, although process 200 is not limited to these primitives.

Step 230 is automatically generating a processor/memory simulation model from the description and the communication protocol. The automatically generated processor/memory simulation model comprises a processor/memory interface comprising the primitives. The interface allows simulation of the processor/memory on a suitable abstraction level. For example, the processor/memory interface may be a functional or a cycle-accurate interface.

While embodiments of the present invention are substantially compliant with the LISA language (Language for Instruction Set Processors), the present invention is not limited to LISA. A more detailed explanation of LISA and related software tools is provided in, "Architecture Exploration for Embedded Processors With LISA," by A. Hoffmann, H. Meyr and R. Leupers. Kluwer Academic Publishers, January 2003.

Exemplary Computer Platform

Figure 3:
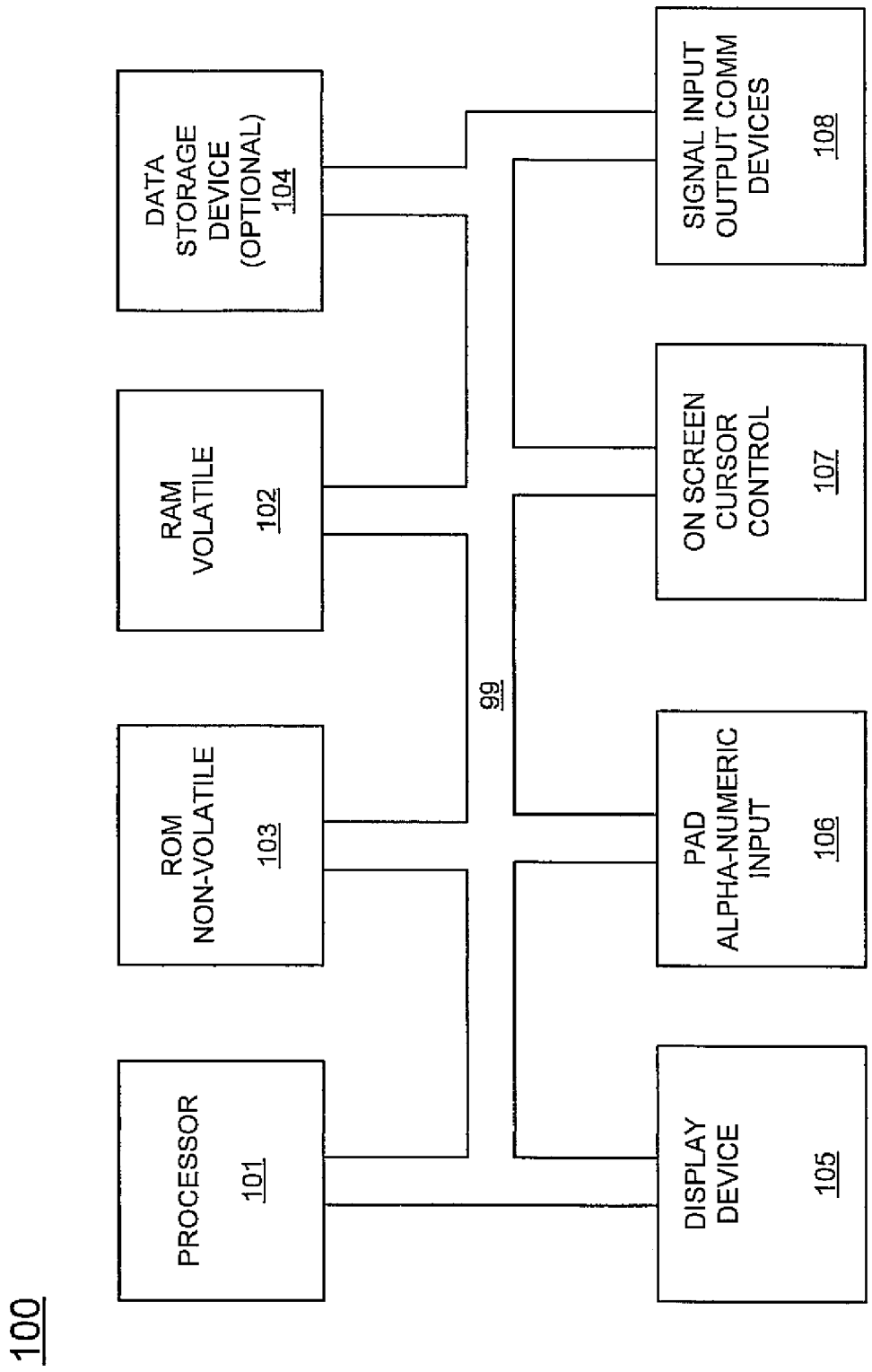
FIG. 3 is an exemplary computer system that may serve as a platform upon which embodiments of the present invention may be executed.

FIG. 3 illustrates circuitry of an exemplary computer system 100, which may form a platform for embodiments of processor/memory co-exploration at multiple abstraction levels. Various process described herein (e.g., process 200, at least some steps of processes 600 and 700) may be implemented on computer system 100. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 3, system 100 may also include an alphanumeric input device 106 including alphanumeric and function keys coupled to bus 99 for communicating information and command selections to central processor unit 101. System 100 may also include a cursor control device 107 coupled to bus 99 for communicating user input information and command selections to central processor unit 101. System 100 of the present embodiment may also include a display device 105 coupled to bus 99 for displaying information. A signal input/output communication device 108 may be coupled to bus 99 provide communication with external devices.

The preferred embodiment of the present invention, a method and system for processor/memory co-exploration at multiple abstraction levels, is thus described. While the present invention has been described in particular embodiments, it should be appreciated that the present invention should not be construed as limited by such embodiments, but rather construed according to the below claims.

What is claimed is:

1. A computer-implemented method of facilitating processor/memory co-exploration, said method comprising:
 accessing a description of a processor in an architecture description language, wherein said architectural description language models said processor on one or more of a plurality of abstraction levels;
 accessing a description of a memory system in said architectural description language, wherein said architectural description language models said memory system on said one or more of said plurality of abstraction levels;
 accessing a description of a communication protocol formed from primitives, suitable for said one or more of said plurality of abstraction levels; and
 automatically generating a processor/memory system simulation model from said description of said processor said memory system and said communication protocol, wherein said processor/memory system simulation model comprises a processor simulation model, a memory system simulation model and a processor/memory interface coupling said processor core simulation model and said memory system simulation model.

2. A method as recited in claim 1, wherein said processor/memory interface comprises a bit accurate interface.

3. A method as recited in claim 2, wherein said one of said plurality of abstraction levels is a bit accurate model.

4. A method as recited in claim 1, wherein said processor/memory interface comprises a cycle accurate interface.

5. A method as recited in claim 4, wherein said one of said plurality of abstraction levels is a cycle accurate model.

6. A computer-implemented system embedded in a computer readable medium and for processor/memory co-exploration, said system comprising:
 memory interface primitives; and
 a simulation generator for automatically generating a processor/memory simulation from a description of a processor in an Architecture Description Language a description of a memory system in said Architecture Description Language and one or more communication protocols, wherein said one or more communication protocols are formed by the composition and sequence of one or more of said memory interface primitives, and wherein said processor/memory simulation includes a processor simulation model, a memory system simulation model and said communication interface at one or more of a plurality of abstraction levels.

7. A system as recited in claim 6, further comprising a memory module library operable to describe memory on multiple abstraction levels in said Architecture Description Language description of a processor/memory system.

8. A system as recited in claim 6, wherein said memory interface primitives are operable to adapt custom memory models to said memory interface primitives for integration into said Architecture Description Language description of said processor/memory system.

9. A system as recited in claim 6, wherein one of said multiple abstraction levels comprise a functional level.

10. A system as recited in claim 6, wherein one of said multiple abstraction levels comprise a cycle-accurate level.

11. A system as recited in claim 6, wherein said communication interface comprises a functional interface.

12. A system as recited in claim 6, wherein said communication interface comprises a cycle accurate interface.

13. A system as recited in claim 6, wherein a processor simulation model in said processor/memory simulation is attachable to a memory simulation environment by adapting said communication protocol to said memory simulation environment.

14. A system as recited in claim 13, wherein memory simulation environment comprises a black box memory simulator.

15. A system as recited in claim 13, wherein memory simulation environment comprises a hardware emulator.

16. A system as recited in claim 13, wherein memory simulation environment comprises a SystemC model.

* * * * *